(12) United States Patent
Larsen et al.

(10) Patent No.: US 6,575,027 B1
(45) Date of Patent: Jun. 10, 2003

(54) MASS FLOW SENSOR INTERFACE CIRCUIT

(75) Inventors: Dwight S. Larsen, Allen, TX (US); Tamas I. Pattantyus, Dallas, TX (US)

(73) Assignee: Mykrolis Corporation, Bedford, MA (US)

( * ) Notice: Subject to any disclaimer, the term of this patent is extended or adjusted under 35 U.S.C. 154(b) by 0 days.

(21) Appl. No.: 09/350,746

(22) Filed: Jul. 9, 1999

(51) Int. Cl.$^7$ .................................................. G01F 1/68
(52) U.S. Cl. ................................. 73/204.17; 73/204.15
(58) Field of Search ........................ 73/204.17, 861.52, 73/202.5, 204.21, 202, 204, 118.2, 204.15; 137/334, 486, 1; 251/335.2; 123/436

(56) References Cited

U.S. PATENT DOCUMENTS

| | | | |
|---|---|---|---|
| 4,475,388 A | * 10/1984 | Kawai et al. | 73/204 |
| 4,487,213 A | * 12/1984 | Gates et al. | 137/2 |
| 4,686,856 A | * 8/1987 | Vavra et al. | 73/204 |
| 5,660,207 A | 8/1997 | Mudd | 137/599 |
| 5,668,313 A | * 9/1997 | Hecht et al. | 73/118.2 |
| 5,765,283 A | 6/1998 | Mudd | 29/890 |
| 5,850,850 A | 12/1998 | Mudd | 137/486 |
| 6,044,701 A | * 4/2000 | Doyle et al. | 73/202.5 |

FOREIGN PATENT DOCUMENTS

| | | | |
|---|---|---|---|
| FR | 2 451 022 A | 10/1980 | G01F/1/68 |
| WO | WO 91/19959 | 12/1991 | G01F/1/68 |
| WO | WO 94/09344 | 4/1994 | G01F/5/00 |

OTHER PUBLICATIONS

*LM2674: SIMPLE SWITCHER Power Converted High Efficiency 500 mA Step–Down Voltage Regulator* by National Semiconductor Corporation dated Sep., 1998.

Silicon Processing for the VLSI Era, pp. 165, 166.

*A Brief Analysis of the Thermal Mass Flow Sensor Excitation Circuit* by Dwight Larson dated Sep. 23, 1998.

International Search Report dated Dec. 12, 2000.

* cited by examiner

Primary Examiner—Harshad Patel
(74) Attorney, Agent, or Firm—Gray Cary Ware & Freidenrich, LLP

(57) ABSTRACT

An improved mass flow sensor interface ("MFSI") circuit and method are disclosed for sensing and measuring mass flow rate of a gas and provide an output voltage proportional to the mass flow rate in a mass flow controller. The improved MFSI circuit of the present invention includes upstream and downstream mass flow sense elements a precision current source to drive the circuit. The circuit further includes an operational amplifier to sum the voltage upstream of the upstream sense element with the voltage downstream of the downstream sense element. A reference voltage is electrically connected to the positive node of the operational amplifier. An upstream shunting resistor and a downstream shunting resistor share a common junction at the negative node of the operational amplifier and are electrically connected in parallel to the upstream and downstream mass flow sense elements. The MFSI circuit of this invention further includes a reference resistor connected between the reference voltage source and the positive node of the operational amplifier and a feedback resistor connected between the positive node and the output of the operational amplifier. The operational amplifier of the MFSI circuit provides an output signal proportional to the resistance change across the upstream and downstream sense elements, and therefore proportional to the gas mass flow rate.

28 Claims, 3 Drawing Sheets

MASS FLOW SENSOR INTERFACE CIRCUIT

TECHNICAL FIELD OF THE INVENTION

This invention relates generally to systems and methods for operating a mass flow controller (MFC) and, more specifically, to systems and methods for measuring mass flow within a mass flow controller by sensing the resistance change of a sense resistor or resistors in response to gas flow.

BACKGROUND OF THE INVENTION

Many manufacturing processes require the flow of process gases to be strictly controlled. To do so, the gas mass flow rate must be sensed and determined. Gas mass flow controllers sense the mass flow rate of a gas substantially independent of gas temperature or pressure, provide a measurement, and meter gas flow to adjust the mass flow rate as desired based on such sensing and metering. Mass flow controllers that operate on heat transfer principles have been widely adapted in the industry.

A common form of mass flow sensor for a gas incorporates a small diameter tube (a capillary tube) having two coils of wire wound on the outside in close proximity to each other, with one coil being positioned upstream of the other. The coils are formed from metallic material having a resistance that is temperature sensitive. The coils are heated by an electrical circuit in a bridge-type electrical circuit incorporated into a sensor to provide equal resistance in the absence of gas flow and hence a balance condition for the bridge-type circuit, i.e., a null output signal.

When gas flows within the capillary tube, the cool incoming gas is warmed as it flows past the upstream element, and this warmer gas then flows past the downstream element, resulting in differential cooling of the two elements. The difference in temperature is proportional to the number of molecules per unit time flowing through the capillary tube. Based on the known variation of the resistance of the coils with temperature, the output signal of the bridge circuit can provide a measure of the gas mass flow.

However, prior art mass flow sensor interface circuits have certain undesirable characteristics. First, prior art circuits compromise the ideal situation where a circuit is simply driving the sensing elements because they include resistances in parallel with the sensing elements for trimming the circuit output to zero volts with zero flow. By doing so, they compromise the apparent gain of the sensor. Sensor gain is traded off for controllability of zero-volt/zero-flow conditions. It is normally undesirable to attenuate the sensor output. If too many impedances of commensurable value are placed in parallel with the sense resistors, they degrade the maximum signal voltage that can be derived from the sense resistors in response to flow.

Secondly, in prior art circuits the relationship between the output voltage (which is proportional to flow) and the difference between the upstream and downstream sense elements is nonlinear, which is an undesirable feature of the prior art. Because the typical resistance values placed in parallel with the upstream and downstream sense elements are not significantly larger than the resistance values of the sense elements, the non-linearity in the relationship between the sense elements and the output voltage is not negligible.

Furthermore, prior art circuits require a large amount of amplification, typically on the order of a 35–70 gain factor, to produce a zero to five-volt output indicative of the gas flow. This requires additional circuitry and complexity.

These prior art circuits require that the output from the sensing circuit be connected to a high input impedance amplifier stage because any load placed on the common junction point of the upstream and downstream sense elements increases the loss of sensor output and the circuit non-linearity.

Further, prior art circuits are designed to be calibrated manually using a gain control potentiometers (pots). In addition, the zero-volt/zero-flow condition also is adjusted manually by an operator using a multimeter. This results in increased circuitry and complexity as well as a greater opportunity for inaccurate mass flow values due to drift in the gain and zero control devices (potentiometers).

Prior art circuits are also susceptible to ambient temperature deviations common to both sense elements. Because prior art mass flow sensing circuits are essentially voltage dividers that can be arbitrarily trimmed to zero output by means of a virtual ground and variable resistors, any ambient temperature change will be reflected in the circuit output voltage. This occurs because prior art systems compare the absolute change in the resistance of the sense resistors. In such a case, even if both elements are cooled or heated equally, the absolute resistance change in each will likely be different.

FIG. 1 shows the basic topology of a prior art flow sensing bridge circuit 100. Flow sensing bridge circuit 100 is a modified Wheatstone bridge driven by an ideal current source 20. An ideal current source is characterized by a very high internal impedance, which means its output current will not change with a change in the voltage drop across a load. Ideal current source 20 can thus supply the same current regardless of the voltage drop across the load.

One branch of prior art flow sensing bridge circuit 100 of FIG. 1 consists of two sense elements, $R_U$ and $R_D$. These sense elements are used to sense the gas flow and are representative of the respective dynamic resistance values of the upstream and downstream sensor coils wound on the outside of the capillary tube; $R_U$ represents the upstream sense element and $R_D$ represents the downstream sense element. The upstream sensor coil is cooled more by the gas stream flow than the downstream sensor coil, therefore the resistance value of $R_U$ is less than that of $R_D$. With no gas flow, $R_U$ is equal to $R_D$ and the bridge is balanced by means of variable resistor RV1. Under nonzero flow conditions, prior art flow sensing bridge circuit 100 output voltage $e_{out}$ 30 is given by Equation 1 below. As shown by Equation 1, the relationship between output voltage $e_{out}$ 30 and $(R_U-R_D)$ is nonlinear.

$$e_{out} = \frac{(R_D R_1 - R_U R_2)i}{(R_U + R_D)\left(1 + \frac{R_1 + R_2}{R_p}\right) + (R_1 + R_2)} \quad \text{[EQN. 1]}$$

The other branch of flow sensing bridge circuit 100 includes resistors R8, R9 and variable resistor RV1. The impedance value of variable resistor RV1 is only a small fraction of the values of resistors R8 and R9. Variable resistor RV1 is used to adjust the offset of flow sensing bridge circuit 100 so that output voltage $e_{out}$ 30 is zero. Resistance value R1 represents the combined value of resistor R8 and the portion of variable resistor RV1 on the resistor R8 side of variable resistor RV1's wiper arm, and resistance value R2 represents the combined value of resistor R9 and the portion of variable resistor RV1 on the resistor R9 side of variable resistor RV1's wiper arm. Typically, the values of R1 and R2 are about eight times as large as those of sense resistors $R_U$ and $R_D$. Additionally, resistor $R_p$ is connected in parallel with sense resistors $R_U$ and $R_D$ and resistors R8 and R9. The value of $R_p$ is about four times as large as that of R1 and R2. The non-linearity of the circuit is therefore non-negligible.

As can be seen in Equation 1 above, the relationship between output voltage $e_{out}$ 30 and sense element resistances $R_U$ and $R_D$ is inherently non-linear. Additionally, Resistors RV1, R8, R9 and $R_p$ connected in parallel with sense elements $R_U$ and $R_D$ reduce the effect of sense elements $R_U$ and $R_D$. Ideally, the entire circuit current should run through sense elements $R_U$ and $R_D$ to obtain the maximum output signal. FIG. 1 therefore demonstrates both the non-linear characteristics of the prior art as well as the reduction in output voltage $e_{out}$ 30 resulting from the use of resistances in parallel with sense elements $R_U$ and $R_D$.

FIG. 2 is a more detailed representation of the prior art flow sensing bridge circuit 100 of FIG. 1. Individual components of ideal current source 20 are shown in detail. The amplitude of the current applied to flow sensing bridge circuit 100 is controlled by a voltage derived from reference voltage source (+5 Vref) 32 applied across resistor R100. The wiper of variable resistor RV1 provides a virtual ground controlled by means of operational amplifier U3 and transistor Q2. Capacitor C1 provides stabilizing feedback (lag compensation). The bridge output voltage is filtered by resistor R11 and capacitor C2. The filter comprised of resistor R11 and capacitor C2 provides a −3 DB cut-off frequency approximately equal to 600 Hz. $e_{out}$ 30 is the filtered output voltage.

+5V reference voltage 32 is inverted by means of operational amplifier U1 to become −5 volt. The −5 volt output of operational amplifier U1 is compared to the voltage drop across resistor R200. Most notably, the −5 volt output of operational amplifier U1 is scaled down to become +1.2775 volt nominal at the output of operational amplifier U2. Although the output of operational amplifier U2 is not exactly 1.2775 volts, it causes transistor Q1 to control the current through reference resistor $R_r$ and the rest of flow sensing bridge circuit 100 in such a fashion that the voltage drop across resistor R9 equals the scaled down value of the −5 volt reference (which has been scaled down and inverted by operational amplifier U2). Therefore, the drop across reference resistor $R_8$, which can be a 100 kilo-ohm resistor, is a precision 1.2775 volt. Consequently, the current through reference resistor $R_r$ is 12.775 mA nominal. The remaining resistors in FIG. 2 are all 1% resistors: R3, R4, R5, R6, R7, R10, R12, and R14, as well as the other resistors previously mentioned.

Ideal current source 20 provides a constant current source regardless of the load being driven by the circuit. This is because the feedback control circuit comprised of operational amplifier U2, transistor Q1, current reference resistor $R_r$ and scaling components R3, R4, R6 and R7, maintains the voltage drop across current reference resistor $R_r$ at 1.2775 volt nominal. As long as the circuit parameters remain within the linear operating range of component values, the value of the current through current reference resistor $R_r$ will remain a precisely controlled and constant value.

When any impedance is driven by an ideal current source such as that in FIG. 2 and the resulting output signal is to be used for further processing, another voltage reference is needed for the signal processing amplifier. The voltage reference in the prior art circuit is provided by variable resistor RV1. The voltage reference can either be actual or virtual. A circuit as shown in FIG. 1 without the grounding at the wiper arm of variable resistor RV1 would represent a totally undefined circuit.

The circuit comprising operational amplifier U3 and transistor Q2 produces a virtual ground at variable resistor RV1. The virtual ground is produced by comparing the voltage at the wiper of RV1 to ground potential at the positive input node of operational amplifier U3. The output of operational amplifier U3 drives transistor Q2 and is controlled in such a fashion as to reduce to zero the voltage between the positive and the negative nodes of operational amplifier U3.

Operational amplifiers typically have an open loop gain factor of anywhere from ten thousand times to a million times, referred to as the differential node voltage. Ideally, the wiper potential at variable resistor RV1 is maintained at zero volts. The deviation from zero is small so as to be negligible. Flow sensing bridge circuit 100 voltage is thus referenced to zero volts.

The output of flow sensing bridge circuit 100 is taken at the junction of upstream and downstream flow sense resistors $R_U$ and $R_D$. When flow sensing bridge circuit 100 is balanced at zero flow by means of variable resistor RV1, the zero voltage that exists at the wiper of variable resistor RV1 is mirrored over to the junction of sense elements $R_U$ and $R_D$; this feature is an inherent property of a Wheatstone bridge. However, when the balance is offset because the resistance value of upstream sense element $R_U$ becomes smaller than the resistance value of downstream sense element $R_D$, while the other branch of flow sensing bridge circuit 100 maintains its previous set balance, the deviation from the balanced state will manifest itself as an output voltage, $e_{out}$ 30.

Referring back to FIG. 1, some typical impedance values are included for R1 and R2, which are individually about 4.07 kΩ. Resistors R8 and R9 are individually 4.02 kΩ resistors and variable resistor RV1 is 100 Ω. If the circuit is perfectly balanced and equal, 50 Ω of RV1 are apportioned to R8 and 50 Ω to R9, hence the 4.07 kΩ value for R1 and R2. $R_P$ is typically about 17.4 kΩ and sense elements $R_U$ and $R_D$ individually are about 500 Ω at working temperature.

It is to be realized that one purpose of the current flowing through sense elements $R_U$ and $R_D$ is to heat them up so that gas flow can differentially cool sense elements $R_U$ and $R_D$, thus sensing gas flow. However, impedances R1 and R2 are only about eight times the value of $R_U$ and $R_D$, hence their shunting effect is non-negligible, and in fact is quite large. The shunting effect is a limitation of prior art circuits because it reduces the value of output voltage $e_{out}$ 30.

SUMMARY OF THE INVENTION

A need exists for an improved mass flow interface circuit that provides the capability to increase sensor output voltage and eliminate the prior art problems associated with output signal reduction by providing a much smaller shunting effect. This can be accomplished by using very large resistances connected in parallel with the upstream and downstream sense elements, and thereby increase the overall effectiveness of the ideal current source.

A further need exists for an improved mass flow sensor interface circuit that eliminates the non-linearity existing in prior art mass flow sensor interface circuits. By using much larger resistances in parallel with the sense elements, the non-linearity effect can be greatly reduced from the prior art circuit.

An even further need exists for an improved mass flow sensor interface circuit that eliminates the need to manually calibrate the circuit using zero and gain adjustments, thereby eliminating the drift problems associated with the prior art circuitry due to temperature and also reducing the sensitivity to vibration which is more likely to affect the adjustable resistors.

Similarly, a still further need exists for an improved mass flow sensor interface circuit that is inherently insensitive to ambient temperature changes and thereby eliminates the temperature drift problems associated with prior art circuits. This is especially advantageous if the circuitry is being operated in an enclosed case where ambient temperature is likely to change.

An even further need exists for an improved mass flow sensor interface circuit that does not require a large degree of amplification of the circuit output voltage to produce a signal indicative of gas flow, and that thus eliminates the need to further process the output voltage signal through an amplifier with a much larger input impedance than the bridge impedances.

In accordance with the present invention, a mass flow sensor interface circuit is provided that substantially eliminates or reduces the disadvantages and problems associated with previously developed mass flow sensor interface circuits. In particular, the present invention provides an improved mass flow sensor interface circuit and method for sensing and measuring mass flow rate of a gas to provide an output voltage proportional to the gas flow rate in a mass flow controller.

The improved mass flow sensor interface circuit of the present invention includes an upstream mass flow sense element, a downstream mass flow sense element, and a precision current source to drive the circuit. The circuit further includes and operational amplifier stage to sum the voltage upstream of the upstream sense element with the voltage downstream of the downstream sense element. A reference voltage is electrically connected to the positive node of the operational amplifier. An upstream shunting resistor and a downstream shunting resistor share a common junction at the negative node of the operational amplifier and are electrically connected in parallel to the upstream and downstream mass flow sense elements.

The present invention further includes a reference resistor electrically connected between the reference voltage source and the positive node of the operational amplifier and a feedback resistor electrically connected between the output and the positive node of the operational amplifier. An output voltage proportional to the resistance change across the upstream and downstream sense elements, and therefore proportional to the gas mass flow rate, is provided as an output of the operational amplifier. The improved mass flow sensor interface circuit of the present invention provides a more linearized output, greater sensitivity, greater reliability and better accuracy than prior art such circuits.

The voltages upstream of the upstream sense element and downstream of the downstream sense element are referenced to +2.5 volts and are added by the operational amplifier. The node voltages of the operational amplifier are maintained at +2.5 volts, with the negative node serving as a virtual ground.

The sensitivity of the mass flow sensor interface circuit of the present invention can be greatly increased over that of such prior art circuits. The effect of the shunting resistors placed in parallel with the upstream and downstream sense elements on circuit sensitivity is minimal. The value of the shunting resistors can typically be about 100 times that of the sensing elements with the result that the non-linear response caused by the summation of the impedance values of the upstream and downstream sense elements in prior art circuits is substantially reduced. The gain of the improved circuit of the present invention can be increased by the appropriate choice of the feedback resistor of the operational amplifier.

The precision current source is further comprised of a series of resistors and operational amplifiers designed to maintain a constant current through the upstream and downstream sense elements. Furthermore, a signal conditioning amplifier can be used to condition the output signal derived from the resistance change in the upstream and downstream sense elements before feeding the output signal to an analog-to-digital converter.

The present invention provides an important technical advantage for an improved mass flow interface circuit that provides the capability to increase sensor output voltage and eliminate the prior art problems associated with output signal reduction by providing a much smaller shunting effect through the use of very large resistances connected in parallel with the upstream and downstream sense elements, and thereby increase the overall effectiveness of the ideal current source.

Yet another technical advantage of the improved mass flow sensor interface circuit of the present invention eliminates the non-linearity existing in prior art mass flow sensor interface circuits. By using much larger resistances in parallel with the sense resistors, the non-linearity effect is greatly reduced over prior art circuits. The ideal current source driving the circuit is made more ideal because the sense resistors see a higher impedance from the current source.

Still another technical advantage of the improved mass flow sensor interface circuit of the present invention eliminates the need to manually calibrate the circuit using potentiometers for the zero flow/zero trim position, thereby eliminating the drift problems associated with the prior art circuitry due to temperature and bumping or jarring of the circuit, which could cause potentiometer misalignment.

A still further technical advantage of the improved mass flow sensor interface circuit of the present invention is that it is inherently insensitive to ambient temperature changes and thereby eliminates the temperature drift problems associated with prior art circuits. This is especially advantageous if the circuitry is being operated in an enclosed area where ambient temperature is likely to change.

An even further technical advantage of the improved mass flow sensor interface circuit of the present invention is that it does not require a large degree of amplification of the circuit output voltage to produce a signal indicative of gas flow, thus eliminating the need to further process the output voltage signal through an amplifier with a much larger input impedance than the bridge impedances.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention provides an improved mass flow sensor interface circuit that is more sensitive, less complex and more reliable than any such prior art circuits. The mass flow sensor interface circuit of the present invention is inherently insensitive to ambient temperature changes and provides an output voltage signal about double the sensitivity of prior art circuits. The present invention substantially reduces the non-linear effects existing in prior art circuits and improves reliability and accuracy by eliminating the need for manual adjustment and calibration of prior art circuit gain pots. The improved mass flow interface circuit of the present invention is therefore simpler, more accurate, more sensitive and more reliable than prior art circuits.

Figure 3:
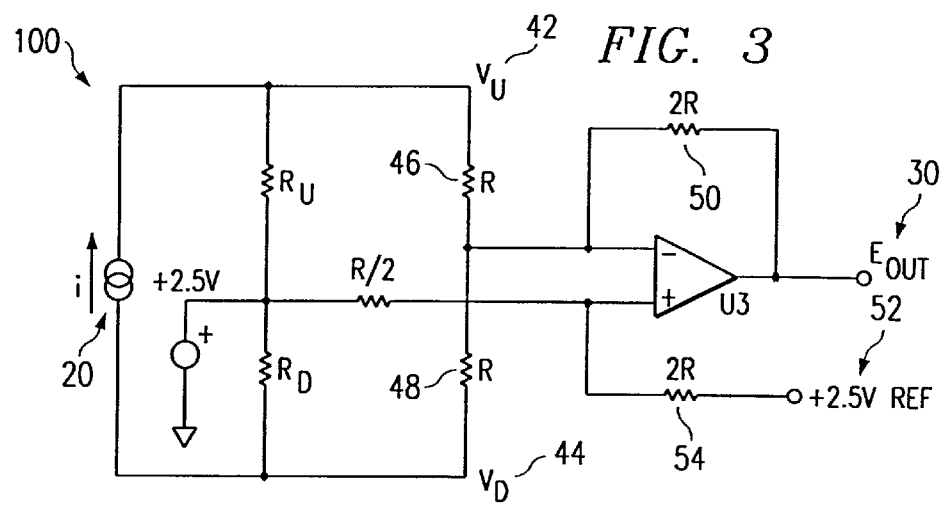
FIG. 3 is a simplified circuit diagram of the bridge topology of the improved mass flow sensor interface circuit of the present invention.

FIG. 3 illustrates the bridge topology of the improved mass flow sensor interface circuit of the present invention. The sense elements $R_u$ and $R_d$ and bridge resistors 46, 48, each of value R, are connected to an i current source 20. The junction of $R_u$ and $R_d$ is connected to a virtual +2.5V source 56. The junction of the bridge resistors 46 and 48 are connected to the negative node of op-amp U3; another resistor, 50, is connected between the negative node of U3 and its output (feedback resistor). The virtual +2.5V source 56 is connected to the positive node of op-amp U3 through a resistor of value R/2 58; the positive node is also connected to the +2.5V REF 52 through a resistor of value 2R 54. This topology forms a carefully balanced differential amplifier which rejects any common mode voltage variation caused by changes in the +2.5V source 56. The output-input transfer function of an amplifier described above is given by $$e_{out} = 2*(V_D - V_U) + 2.5V \text{ REF} \quad \text{[EQN.2]}$$

where $V_D$ is the downstream sensor voltage, $V_U$ is the upstream sensor voltage.

A major advantage of the improved mass flow sensor interface circuit of the present invention is therefore that the output signal, $e_{out}$ 30, available from the circuit can be approximately doubled. Additionally, the non-linear effects caused by the relationship between $e_{out}$ 30 and the parallel resistors of the prior art are reduced by a factor of about 100. The bias of output voltage $e_{out}$ 30 can also be raised to 2.5 volts to create a new system reference for the analog-to-digital converters intended to be used by this invention.

Figure 1:
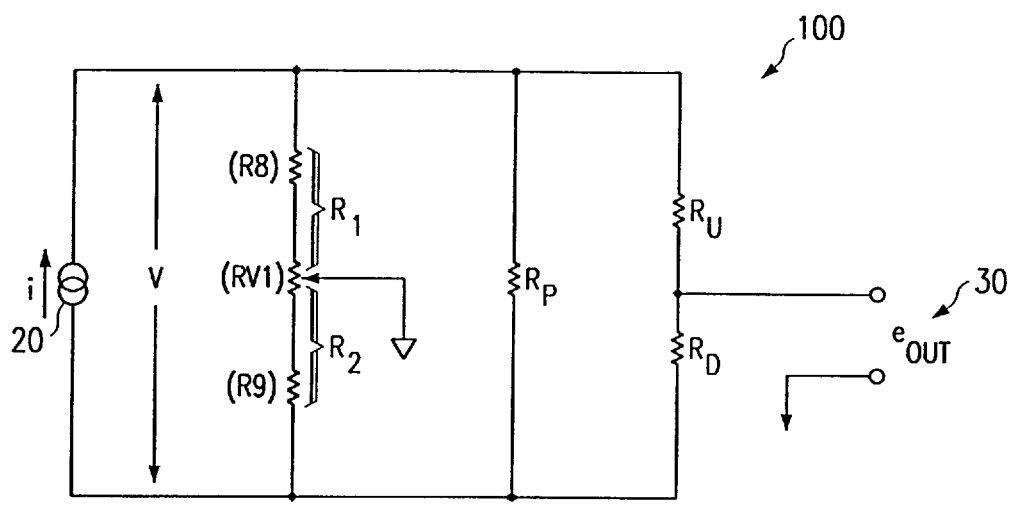
FIG. 1 shows a prior art mass flow sensor bridge circuit.

Furthermore, the improved mass flow sensor interface circuit of the present invention shown in FIG. 3 eliminates the problems associated with prior art manual adjustment of gain pots to provide offset balancing. By eliminating the use of a variable resistor, such as variable resistor RV1 of FIG. 1, the present invention eliminates the problem of lack of stability in time and temperature associated with variable resistors. The problem of not having the same balance at one temperature as may be required at a different temperature is therefore eliminated.

Variable resistors used in prior art circuits are not as stable over either temperature or time as are the precision, high-tolerance, high-stability resistors used in the present invention. The improved mass flow interface circuit of the present invention therefore can eliminate a number of potential errors that can develop in response to temperature or, over time, by providing an automatic zero. The circuit of the present invention essentially adds the voltage drop across upstream sense element $R_U$ and downstream sense element $R_D$, which are opposite in polarity. Therefore, when the sensor outlets are equal, the circuit is inherently trimmed to zero. Obviously, there can be slight variations in the output, but these variations are negligible because they can be compensated for outside the circuit. The zero offset can be removed by software used to control the mass flow controller of which the improved mass flow sensor interface circuit of the present invention is a part.

Additionally, by providing an inherently linear circuit, the improved mass flow sensor interface circuit of the present invention provides a circuit that is very close to ideal. The equation for the output voltage signal from the improved mass flow sensor interface circuit of the present invention is given by $$e_{out} = 2.5 - \frac{2i(R_U - R_D)}{1 + (R_U + R_D)/2R} \quad \text{[EQN. 3]}$$

Eqn. 3 above shows that the sensitivity relative to the term $(R_U - R_D)$ is almost double that of the prior art. Also, the effect of resistors 46 and 48 on the sensitivity is very small and is substantial in reducing the non-linear response caused by the term $(R_U + R_D)$. Lastly, the circuit gain can be increased by the appropriate choice of feedback resistor 50. The value of feedback resistor 50 and reference resistor 54 is typically twice that of resistors 46 and 48. In practice, the improved mass flow sensor interface circuit of the present invention comes very close to a $[2i(R_U - R_D)]$ value for the output voltage. This is because the $(R_U + R_D)$ term in the denominator of Eqn. 3 is reduced by two times R, and the ratio of $R_U + R_D / 2R$ is approximately 0.01. The effect of this non-linearity is therefore reduced by a factor of 100. The resistance value of resistors 46 and 48 is an arbitrary choice within circuit design limits. The resistance value can be made very large, and as R becomes very large the $R_U + R_D / 2R$ term in the denominator goes to zero, further reducing the circuit non-linearity. Notice that the factor "2" in Eqn. 3 can also be increased by increasing the values of resistors 50 and 54 in FIG. 3 to values larger than 2R. The gain of the signal conditioning stage is controlled by the ratio of resistor 50 and resistor 46 (48). The value of resistor 54 is always matched to that of 50 in order to maintain the balance of the amplifier circuit.

Figure 4:
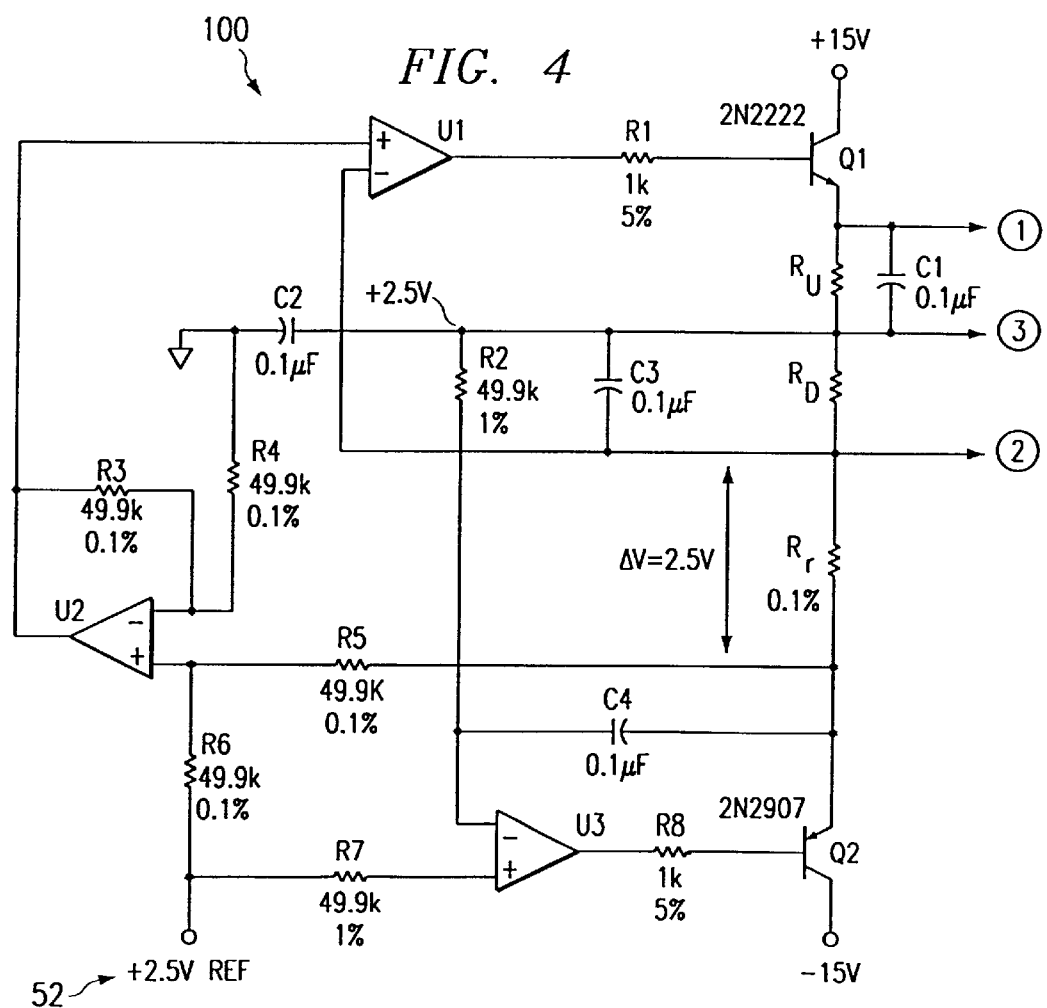
FIG. 4 shows a more detailed circuit diagram of the precision current source of the improved mass flow sensor interface circuit of the present invention shown in FIG. 3.

FIG. 4 is a circuit diagram of precision current source 40 illustrating how the improved mass flow sensor interface circuit of the present invention precisely controls the current flow through sense elements $R_U$ and $R_D$. As shown in FIG. 4, precision reference voltage source 52 is used to both control the circuit current and to establish the 2.5 volt dynamic virtual ground at the negative node of op-amp $U_3$.

Figure 2:
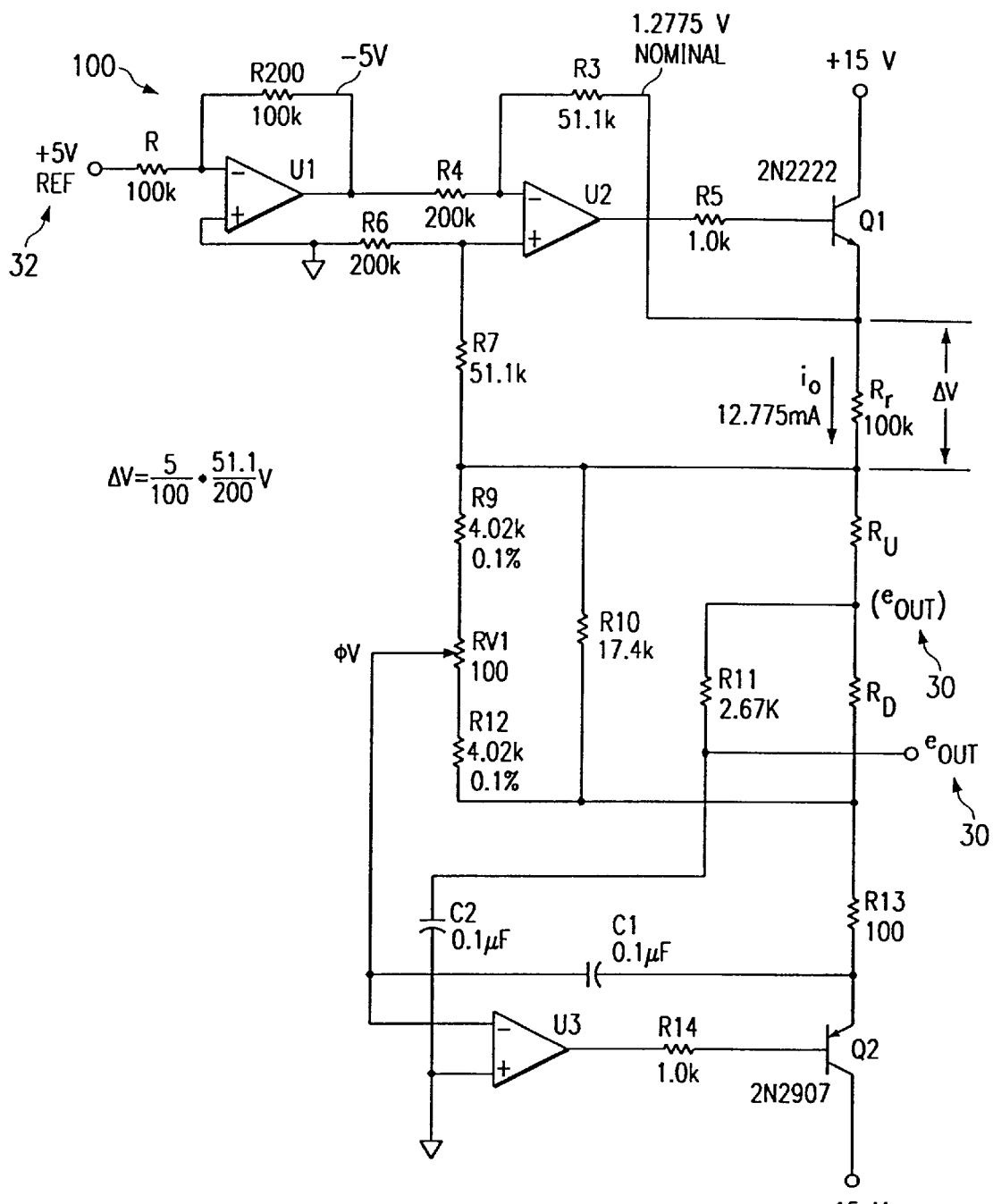
FIG. 2 is a circuit diagram of a prior art ideal current source and zero reference control circuit.

In the implementation of the precision source as shown in FIG. 4, as in the prior art, a voltage drop across a current measuring resistor $R_r$ is produced to measure the current that will flow through sense elements $R_U$ and $R_D$. However, the placement of current measuring resistor $R_r$ is changed from the prior art (shown in FIG. 2) where the current measuring resistor $R_r$ followed the emitter of transistor Q1. In the embodiment of the present invention shown in FIG. 4, current measuring resistor $R_r$ is placed to be in contact with the emitter of transistor Q2 so as to be at the negative end of the circuit. This is necessary because the improved mass flow sensor circuit of the present invention raises the pedestal reference voltage by +2.5 volts.

The flow of current through the circuit is controlled by operational amplifier stages U1 and U2, transistor Q1, reference voltage source 52 and current measuring resistor $R_r$. Current measuring resistor $R_r$ is placed at the negative end of the circuit over the center to preserve the positive supply voltage headroom for operational amplifier U1. Since the mass flow interface circuit 100 is referenced at 2.5 volts, the voltage drop on each of sense elements $R_D$ and $R_U$ is approximately 5 volts, the emitter voltage of transistor Q1 is at +7.5 volts, and the base voltage of transistor Q1 is at 8.2 volts. Because the positive supply voltage can be as low as +12 volts (±15-volt supply voltage values are nominal), operational amplifier stage U1 is forced to work near to its maximum positive output. Any additional voltage drop pushing the emitter voltage of transistor Q1, and with it the output voltage of operational amplifier U1, may reduce the margins of the linear operating range of op-amp U1. Operational amplifiers U1 and U3 work in their linear ranges and so there is typically no problem of running out of voltage supply for these two operational amplifiers.

Although the position of current measuring resistor $R_r$ has been changed, the current through the circuit is still being controlled through transistor Q1. As in the prior art, some level translation of precision +2.5 volts reference voltage is made so that operational amplifier U1 senses the difference across current measuring resistor $R_r$, but op-amp U1 senses this difference shifted down by some amount of voltage. However, operational amplifier U1 is only sensitive to the difference across current measuring resistor $R_r$ so together with operational amplifier U2 it still controls the current flow. Operational amplifier U2 produces an output which is exactly 2.5 volts above the emitter voltage of transistor Q2 (i.e., the lower end of current measuring resistor $R_r$) and that is presented to the positive node of operational amplifier U1. The voltage at the top of current measuring resistor $R_r$ is presented to the negative node of op-amp U1. Because of this, operational amplifier U1 must produce a current with the help of transistor Q1 that produces an exact 2.5 volt drop across current sense element $R_r$. The voltage that exists at the junction point of sense elements $R_U$ and $R_D$ is controlled by means of operational amplifier U4 and transistor Q2. This is done by means of reference voltage source 52 connected to the positive node of operational amplifier U4 in combination with the junction voltage of $R_U$ and $R_D$ at the negative node of U4.

Resistors R2 and R7 are equal in value (approximately 50 kΩ) and can be used to eliminate the voltage drop caused by the node bias currents as discussed as part of FIG. 3 above. Standard 1% value resistors can be used throughout the circuit. Other resistance value resistors can be used, however they must all be of the same resistance value or in the proportions shown in FIG. 4. Resistor R2 is necessarily attached to the negative node of operational amplifier U4 to provide a stabilizing feedback with capacitor C4, and to match the offset voltages between the nodes of operational amplifier U4 by matching the resistance value is used in the positive node of op-amp U4.

Frequency sensitive feedback is necessary to minimize the effect of high-frequency noise in mass flow sensor circuit 100. Mass flow sensor circuit 100 contains several sources of high-frequency noise, including operational amplifiers U1, U2 and U4. Transistors Q1 and Q2 likewise can generate high-frequency noise. Even the resistors in the circuit can generate some high-frequency noise. Additionally, not shown in mass flow sensor circuit 10, but implicit to the circuit, are time delays and other filtering effects that are inherently part of operational amplifiers U1, U2, U4 and transistors Q1 and Q2. These time delays and filtering effects happen at very high frequency, and it is possible that mass flow sensor circuit 100 can become unstable at some very high frequency and produce an unwanted oscillation in the constant current through the circuit. The negative feedback provided by resistances R2 and C4 attached to the negative node of operational amplifier U3 define the overall response at a comparatively low frequency and swamp out the noise-contributing components of the circuit.

In this regard, the overall effect of capacitor C4, in conjunction with operational amplifier U3 and resistor R2, is to stabilize mass flow sensor circuit 10. Should there be any oscillatory tendencies in the mass flow sensor circuit 100 due to time delays or other contributing factors, they are reduced or eliminated by this feedback circuitry.

The output of operational amplifier U2 is more positive by exactly +2.5 volts than the emitter voltage of transistor Q2. Operational amplifier U1 is a level translator and its output will control the base voltage of transistor Q1 so that the emitter current of transistor Q1 will produce a voltage drop of exactly 2.5 volts across current measuring resistor $R_r$.

Operational amplifier U4 serves as a level translator. Its positive node can be connected to +2.5 volt reference voltage source 52 and its negative node to the common juncture point of upstream sense element $R_U$ and downstream sense element $R_D$. The output of operational amplifier U4 can drive the base of PNP transistor Q2 so that the junction point of upstream sense element $R_U$ and downstream sense element $R_D$ will be at +2.5 volt (i.e. virtual +2.5 volt). All resistors associated with the precision current source of FIG. 4 as shown are 0.1%, 25 ppm per degree Celsius precision components. Other component values may also be used.

Figure 5:
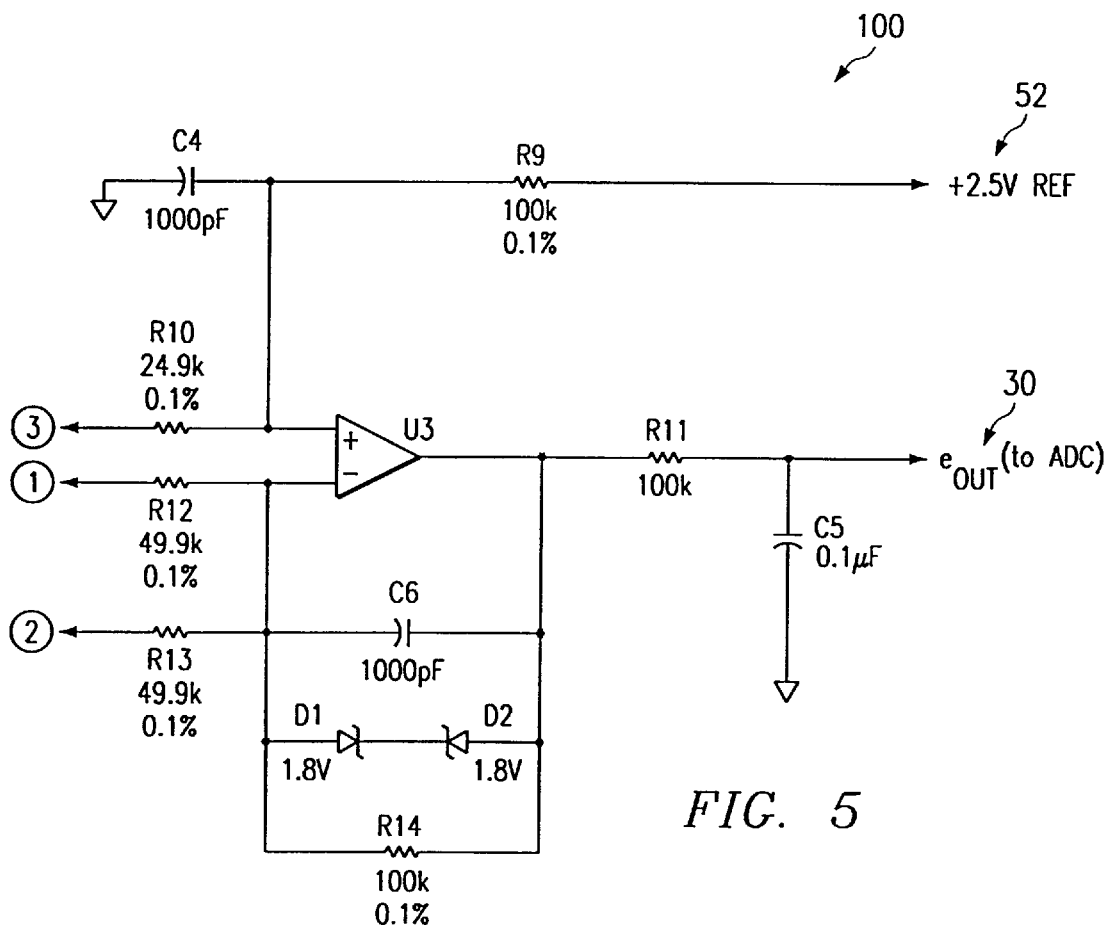
FIG. 5 is a detailed circuit diagram of the signal conditioning amplifier of the improved mass flow sensor interface circuit of the present invention shown in FIG. 3.

FIG. 5 is a more detailed circuit diagram of operational amplifier U3 of FIG. 3. Operational amplifier U3 in FIG. 5 is the same operational amplifier U3 as in FIG. 3. Operational amplifier U3 serves as a signal conditioning amplifier and includes zener diodes D1 and D2, as well as capacitors C5 and C6 and resistors R9 through R14. Resistors R9, R10, R11, R12, R13 and R14 are precision resistance components. The nominal gain of operational amplifier U3 is x2.004. Capacitors C4 and C6 provide an active filter function with cutoff frequency at 1.59 kHz. Another lowpass filter is formed with resistor R11 and capacitor C5. The cutoff frequency of this filter is at 15.9 kHz.

Diodes D1 and D2 limit the maximum output voltage of operational amplifier U3 to +2.5 volt ±2.4 volt. This is necessary in case one of the sense elements $R_U$ and $R_D$ were to become an open circuit or get disconnected. In that event, the output of operational amplifier U3 would be forced to voltage levels which might destroy subassemblies driven by operational amplifier U3 (such as an analog-to-digital converter).

With an open circuit at the input, zener diodes D1 and D2 can break down very quickly and very precisely at the zener voltage. Thus, if operational amplifier U3 goes highly positive, zener diode D1 will function as a zener diode. However, zener diode D2 will now operate in its forward direction as a conventional diode and the drop across it will be approximately 0.6 volt. The overall effect is that the circuit clamps the output of operational amplifier U3 at 2.5 volts above the node voltage, which is itself maintained at 2.5 volt. Mass flow sensor circuit 100 thus provides a +2.5 volt±2.4 volt output from operational amplifier U3. In essence, the output voltage is limited from zero to five volts. In this way, the input of an analog-to-digital converter connected to the output of operational amplifier U3 is protected and not over-driven.

Resistors R9 and R14 of FIG. 5 are the same as resistors 50 and 54 of FIG. 3. Likewise, resistors R12 and R13 are summing resistors that are labeled resistors 46 and 48 in FIG. 3.

Operational amplifier U3 of this invention as shown in FIG. 5 thus provides the advantage of limiting the output 30 of mass flow sensor circuit 100 connected to an analog-to-digital converter. This is done because the possibility exists that sense elements $R_U$ and $R_D$ and the circuit board containing mass flow sensor circuit 100 may be two different physical assemblies. It is therefore conceivable that the circuit board could be powered up without either of sense elements $R_U$ or $R_D$ connected. Some protection is therefore provided for various combinations such as upstream sense element $R_U$ connected but downstream sense element $R_D$ disconnected, or vice versa, which could introduce some very odd voltage swings into the circuitry.

This danger exists when one or the other or both of the sensing elements are disconnected from the circuit board.

In summary, the present invention provides an improved mass flow sensor interface circuit. The improved mass flow interface circuit of the present invention also reduces the non-linearity in the circuitry between the output voltage and the shunting resistors, eliminates the necessity for manually-adjusted variable resistors to balance the circuit, and is inherently insensitive to ambient temperature changes that can and do affect prior art circuits. In the present invention, a precisely controlled current is passed through upstream and downstream sense elements $R_U$ and $R_D$ that are connected in series so that current flows first through upstream sense element $R_U$ and then through downstream sense element $R_D$. The junction of the two sensing elements is held at +2.5 volt, resulting in a voltage drop $V_U$ across upstream sense element $R_U$ that is more positive than +2.5 volts and a voltage drop $V_D$ across downstream sense element $R_D$ that is less positive than +2.5 volts. Voltages $V_U$ and $V_D$ are added in the summing node of an operational amplifier U3. The placement of sense elements $R_U$ and $R_D$ and of a current control resistor $R_r$ is such that the operational amplifier stages and transistors in the mass flow interface circuit current control loop are ensured adequate operating range. The same +2.5 volt reference voltage source determines the measuring current, the bias point of the sensor output, and the sensitivity of an analog-to-digital converter connected to the circuit output. Thus any changes in the reference voltage will have minimal or no effect on the overall performance of the circuit. Implicit in the use of the lower gain amplifier U3 is the fact that an analog-to-digital converter with greater sensitivity and programmable gain is used in the mass flow controller system.

The present invention can be used in a mass flow controller. Various mass flow controllers exist on the market. A mass flow controller may include a linearization circuit to aid in linearizing the flow sense signal. Particular reference is made to U.S. patent application Ser. No. 09/350,747 filed on Jul. 9, 1999, by T. T. Pattantyus, et al., entitled "System and Method for Sensor Response Linearization." A mass flow controller may also include a derivative controller that corrects the sensed flow signal to more accurately approximate the actual flow through the mass flow controller. Particular reference is made to the derivative controller disclosed in U.S. patent application Ser. No. 09/351,120 filed on Jul. 9, 1999, by E. Vyers, entitled "System and Method for a Digital Mass Flow Controller." A PI controller can also be included in a mass flow controller to generate a valve drive signal to control a valve in the mass flow controller. The PI controller can increase the speed of response of the mass flow controller and compensate for a nonlinear response of the valve to the valve drive signal. Particular reference is made to the PI controller disclosed in U.S. patent application Ser. No. 09/351,098 filed on Jul. 9, 1999, by E. Vyers, entitled "System and Method for a Variable Gain Proportional-Integral (PI) Controller." Lastly, the valve drive signal in a mass flow controller can be input to valve drive circuitry to control a solenoid activated valve. Reference is made to the valve drive circuitry disclosed in U.S. patent application Ser. No. 09/351,111 filed on Jul. 9, 1999, by T. T. Pattantyus, entitled "Method and System for Driving a Solenoid." Mass flow controllers can implement a closed loop control algorithm. Reference is made to the advanced digital control algorithm disclosed in U.S. patent application Ser. No. 09/350,744 filed on Jul. 9, 1999, by K. Tinsley entitled "System and Method of Operation of a Digital Mass Flow Controller." It is important to note that the present invention is not limited to use in a mass flow controller that includes the components described above.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A circuit for sensing and measuring mass flow rate of a gas to provide an output signal proportional to said mass flow rate in a mass flow controller, comprising:

a precision current source to drive said circuit;

an upstream mass flow sense element electrically connected to the precision current source;

a downstream mass flow sense element electrically connected to the upstream mass flow sense element and the precision current source;

an operational amplifier to provide the output signal;

a reference voltage source electrically connected to a positive node of the operational amplifier;

an upstream shunting resistor and a downstream shunting resistor sharing a common junction at a negative node of the operational amplifier and electrically connected in parallel to the upstream and downstream mass flow sense elements;

a first reference resistor electrically connected between the reference voltage source and the positive node of the operational amplifier; and a feedback resistor electrically connected between a negative node and the output of the operational amplifier; and a second reference resistor of value of half of a bridge resistance electrically connected between the positive node of the operational amplifier and junction of the upstream and downstream mass flow sense elements.

2. The circuit of claim 1, wherein the precision current source further comprises:

a measuring resistor for measuring flow of current;

at least one other operational amplifier and a first transistor that, together with the measuring resistor, control the flow of current through the circuit; and a second transistor for maintaining the voltage at a junction of the upstream and downstream mass flow sense elements.

3. The circuit of claim 1, further comprising a signal conditioning amplifier to control amplitude of the output signal.

4. The circuit of claim 1, wherein the upstream and downstream mass flow sense elements have resistance values that are temperature dependent.

5. The circuit of claim 1, wherein the upstream and downstream mass flow sense elements are precision resistors.

6. The circuit of claim 1, wherein the upstream and downstream mass flow sense elements are electrically conductive wire.

7. The circuit of claim 1, wherein the output signal is forwarded to an analog-to-digital converter within the mass flow controller.

8. The circuit of claim 1, wherein the reference voltage source is a +2.5 volt reference voltage source.

9. The circuit of claim 1, wherein the upstream and downstream mass flow sense elements are electrically connected such that the upstream mass flow sense element is electrically and physically upstream of the downstream mass flow sense element.

10. The circuit of claim 1, wherein the first op-amp resistor and the third op-amp resistor have equal resistance values and the second op-amp resistor has a value equal to the parallel equivalent of the fourth and fifth op-amp resistors.

11. The circuit of claim 1, wherein resistance value of the feedback resistor can be varied to control the gain of the operational amplifier.

12. The circuit of claim 1, wherein a bias created by the reference voltage source electrically connected to the positive node of the operational amplifier creates a virtual +2.5 volt source at the junction of the upstream and downstream sense resistors of the operational amplifier.

13. A method for sensing and measuring mass flow rate of a gas to provide an output signal proportional to said mass flow rate in a mass flow controller with a circuit, comprising:
    providing a precision current to an upstream mass flow sense element and a downstream mass flow sense element;
    providing the precision current to a first shunting resistor and a second shunting resistor connected in parallel to the upstream mass flow sense element and the downstream mass flow sense element;
    applying a first junction signal occurring at the junction of the first shunting resistor and second shunting resistor to a negative node of an operational amplifier;
    providing a reference voltage from a reference voltage source to a positive node of the operational amplifier through a first reference resistor connected between the reference voltage source and the positive node of the operational amplifier;
    providing a feedback resistance between the negative node of the operational amplifier and an output of the operational amplifier; and
    providing an output signal from the operational amplifier to at an output of the circuit.

14. The method of claim 13, wherein step of providing a precision current to an upstream mass flow sense element and a downstream mass flow sense element, further comprises:
    measuring a flow of current with a measuring resistor;
    controlling the flow of current with at least one other operational amplifier and a first transistor; and
    maintaining the voltage at a junction of the upstream and downstream mass flow sense elements with a second transistor.

15. The method of claim 13, further comprising:
    controlling the gain of the output signal with a signal conditioning amplifier.

16. The method of claim 13, wherein the step of sensing the gas mass flow rate with the upstream mass flow sense element and the downstream mass flow sense element further comprises sensing the mass flow rate with upstream and downstream mass flow sense elements that have resistance values that are temperature dependent.

17. The method of claim 13, wherein the step of sensing the gas mass flow rate with the upstream mass flow sense element and the downstream mass flow sense element further comprises sensing the gas mass flow rate with upstream and downstream mass flow sense elements that comprise precision resistors.

18. The method of claim 17, wherein all resistors are 1% precision resistors.

19. The method of claim 13, wherein the step of sensing the gas mass flow rate with the upstream mass flow sense element and the downstream mass flow sense element further comprises step of sensing the gas mass flow rate with the upstream mass flow sense element and the downstream mass flow sense element that comprise conductive wire.

20. The method of claim 13, further comprising forwarding the output signal to an analog-to-digital converter within the mass flow controller.

21. The method of claim 13, wherein the step of providing a reference voltage from a reference voltage source further comprises providing a reference voltage from a +2.5 volt reference voltage source.

22. The method of claim 13, wherein the step of sensing the gas mass flow rate with the upstream mass flow sense element and the downstream mass flow sense element further comprises sensing the gas flow rate with upstream and downstream mass flow sense elements that are electrically connected such that the upstream mass flow sense element is electrically and physically upstream of the downstream mass flow sense element.

23. The method of claim 13, further comprising providing a virtual voltage to the junction of the upstream mass flow sense element and downstream mass flow sense element.

24. The method of claim 13, wherein the step of providing a feedback resistance between the negative node of the operational amplifier and the output of the operational amplifier further comprises providing a feedback resistance equal to the resistance provided between the reference voltage source and the positive node of the operational amplifier.

25. The method of claim 13, further comprising varying the resistance value of the feedback resistor to control the gain of the operational amplifier.

26. The method of claim 13, further comprising creating a virtual ground at the negative node of the operational amplifier with a bias created by the reference voltage source electrically connected to the positive node of the operational amplifier.

27. The method of claim 13, further comprising:
    providing a resistance between the positive node of the operational amplifier and the junction of the upstream and downstream mass flow sense elements.

28. The method of claim 27, wherein the step of providing a resistance between the positive node of the operational amplifier and the junction of the upstream and downstream mass flow sense elements further comprises providing a resistance that is about half the bridge resistance between the positive node of the operational amplifier and the junction of the upstream and downstream mass flow sense elements.

* * * * *

UNITED STATES PATENT AND TRADEMARK OFFICE
CERTIFICATE OF CORRECTION

| | | |
|---|---|---|
| PATENT NO. | : 6,575,027 B1 | Page 1 of 1 |
| DATED | : June 10, 2003 | |
| INVENTOR(S) | : Dwight S. Larson and Tamas I. Pattantyus | |

It is certified that error appears in the above-identified patent and that said Letters Patent is hereby corrected as shown below:

Title page,
Item [75], Inventors, delete "Larsen" and insert -- Larson --

Signed and Sealed this

Twenty-first Day of October, 2003

JAMES E. ROGAN
*Director of the United States Patent and Trademark Office*